United States Patent [19]
Lewis et al.

[11] Patent Number: 5,442,365
[45] Date of Patent: Aug. 15, 1995

[54] TECHNIQUE FOR PROCESSING INTERFERENCE-CONTAMINATED RADAR ENERGY

[76] Inventors: Bernard L. Lewis, 13318 Fort Wash. Rd., Oxon Hill, Md. 20022; Frank F. Kretschmer, Jr., 12707 Claxton Dr., Laurel, Md. 20811

[21] Appl. No.: 609,752

[22] Filed: Sep. 2, 1975

[51] Int. Cl.⁶ .......................... G01S 3/16; G01S 7/36
[52] U.S. Cl. ........................... 342/381; 342/19; 342/382
[58] Field of Search .............. 343/18 E, 100 LE, 7 A; 325/371, 474, 475; 342/382, 381, 19

[56] References Cited
U.S. PATENT DOCUMENTS 3,870,996 3/1975 Miller .................................. 343/18 E
3,943,511 3/1976 Evans et al. .................. 343/100 LE

*Primary Examiner*—Stephen C. Buczinski
*Attorney, Agent, or Firm*—Thomas E. McDonnell

[57] ABSTRACT

A technique for improving sidelobe canceller performance by blocking the canceller output signal upon sensing reduced main channel interference accompanied by an increased sidelobe canceller output. Two signal processing networks form the difference between successive output signals from a radar antenna and sidelobe canceller respectively. The difference signals are multiplied together and the product used to control passage and preclude utilization of the canceller output signal when reduced jamming interference occurs.

2 Claims, 1 Drawing Sheet

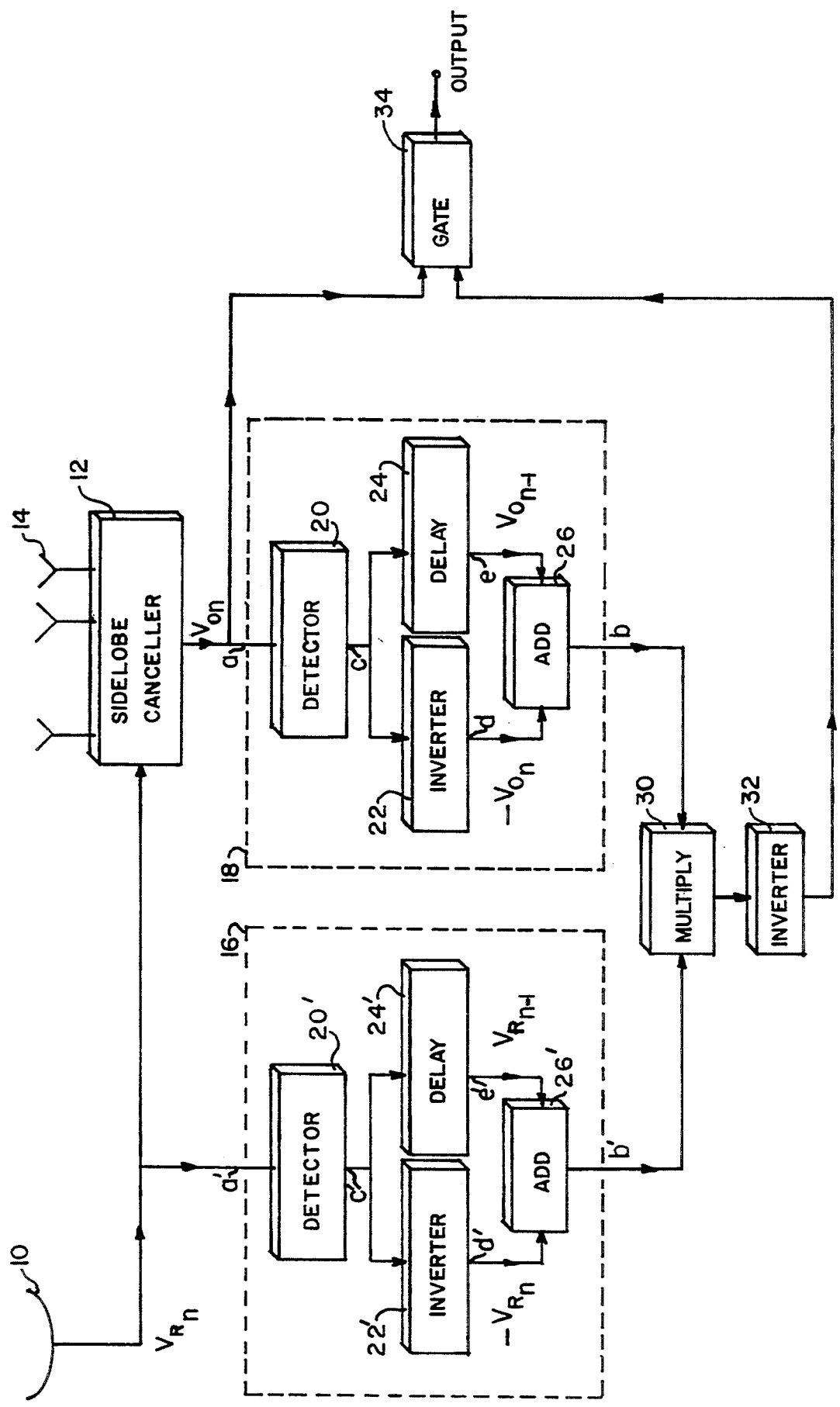

TECHNIQUE FOR PROCESSING INTERFERENCE-CONTAMINATED RADAR ENERGY

BACKGROUND OF THE INVENTION

Broadband noise jammers can destructively interfere with each other in space in a manner similar to that well-known for continuous wave jammers. This destructive interference between broadband jammers occurs with each other for time periods which are on the order of the reciprocal of their effective bandwidths. In general, the effective bandwidth of the jammers is that bandwidth which can enter a radar receiver (i.e., the radar bandwidth). This destructive interference allows two or more noise jammers located at different azimuth angles from the main radar antenna to cancel each other (e.g., at the radar antenna) for short periods of time, and simultaneously to not cancel each other at one or more auxiliary antennas at a different location from the main radar antenna. Cancellation, or destructive interference can occur (at the radar antenna) between two or more jamming signals while constructive interference between the jamming signals at one or more of the auxiliary antennas is simultaneously present.

During periods of cancellation between interfering broadband noise signals, limited bandwidth loops, generally important elements of sidelobe cancellers, cannot respond quickly enough to a sudden reduction of the jamming signal (i.e., "dropout") in the received radar signal. (A typical signal canceller employing loops of this nature is described in U.S. Pat. No. 3,202,990 to P. W. Howells.) Because the canceller loops cannot respond quickly enough, they continue to subtract (from the radar signal) a signal proportional to the strength of the jamming signal being received. Since the jamming signal simultaneously being received at the auxiliary antenna is not correlated with any signal from the main radar antenna, the subtraction itself has the same effect as if the main radar signal were being interfered with by a uncancelled jammer signal.

The present invention provides a technique for utilizing the unmodified radar signal during periods when the jammer signals are reduced or cancelled at the radar antenna.

SUMMARY OF THE INVENTION

The present invention is a technique for improving performance of radar systems that utilize sidelobe canceller subsystems. This technique prevents the canceller from introducing spurious undesirable anti-jamming signals into the received radar signal during periods when jamming signals are, in effect, not present at the main radar antenna but are present at auxiliary antennas.

The technique of the present invention interrupts and prevents utilization of the canceller output signal upon sensing reduction or cancellation of jammer interference in the main channel when accompanied by an increased sidelobe canceller output signal. Sensing the reduction in jamming signal is accomplished by first forming a difference signal between two successive signals from the radar antenna and a difference signal between two successive signals from the sidelobe canceller, and then multiplying these two difference signals together. The product signal is then indicative of reduced jamming interference in the radar channel accompanied by increased canceller output signal. This product signal is then utilized to control further use of the sidelobe canceller output signal.

It is therefore an object of the present invention to improve performance of radar systems employing sidelobe cancellers in a multiple jamming environment;

It is another object of the present invention to prevent a sidelobe canceller from introducing spurious undesirable anti-jamming signals into a received radar signal during periods when jamming signals are present on at least one auxiliary antenna but not effectively present at the radar antenna.

Other objects, advantages and novel features of the invention will become apparent from the following detailed description of the invention when considered in conjunction with the accompanying drawings wherein:

DESCRIPTION OF THE DRAWINGS

The Figure depicts, in schematic block diagram, a preferred embodiment (implementing the technique) of the present invention.

DETAILED DESCRIPTION

Referring to the Figure, a main Radar Antenna 10 is coupled to a main input of a Sidelobe Canceller 12. It should be noted here that the output of the Radar Antenna is taken to generally include "front end" or other components necessary for early stages of incoming radar signal processing. A plurality of Auxiliary Antennas 14 are coupled to corresponding auxiliary input terminals of Sidelobe Canceller 12.

A pair of identical Signal Processing Networks 16, 18 are utilized in this described embodiment of the present invention. Each of the Networks 16, 18 has an input terminal "a" and an output terminal "b". Each of the Networks 16, 18 has a Signal Detector 20 coupled to its input terminal "a". Signal Detector 20 has an output terminal "c" coupled to the input of an Inverter Device 22 and a Delay Device 24. An Add Device 26 has a first input terminal coupled to an output terminal "d" of Inverter 22, and has a second input terminal coupled to an output terminal "e" of Delay Device 24. The output terminal "b" is formed by the output terminal of Add Device 26.

First Signal Processor 16 has its input terminal "a" connected to the output of Radar Antenna 10, while the Second Signal Processor 18 has its input terminal a connected to the output of sidelobe canceller 12.

A multiplier device 30 has a first input connected to output terminal b of processing network 16, and has a second input connected to output terminal b of processing network 18. The output of multiplier 30 is connected through an inverting amplifiers 32 to a first input terminal of an inhibit gate 34. A second input terminal of inhibit gate 34 is connected to the output of sidelobe canceller 12.

In operation, the embodiment of the present invention senses reduction in jamming signal interference to the main signal accompanied by increased sidelobe canceller output. Upon sensing this reduction, the described embodiment blocks the canceller output signal from being further processed by the radar system.

The radar input signal $V_{Rn}$ is applied to the sidelobe canceller 12, and to the first signal processing network 16. (Subscript n denotes the $n^{th}$ return signal pulse being processed.)

Detectors 20, 20' incorporate an output filter matched to the video bandwidth of the radar signal being received. The previously detected video output signal $\overline{V}_{Rn}$ from detector 20' is delayed (in delay device 24') by one radar pulse length (i.e., the reciprocal of the radar bandwidth). The undelayed output signal $\overline{V}_{Rn}$ is inverted by inverter 22' and added to $\overline{V}_{Rn-1}$ to yield the difference signal $(\overline{V}_{Rn-1} - \overline{V}_{Rn})$ at the network 16 output terminal b'.

The output signal $V_{on}$ of sidelobe canceller 12 is applied to the input terminal a of signal processing network 18. In a manner similar to that just described for signal processing network 16, signal $\overline{V}_{on}$ is processed to form an output signal $(\overline{V}_{on-1} - \overline{V}_{on})$ at output terminal b of network 18.

The signals $(\overline{R}_{Rn-1} - \overline{V}_{Rn})$ and $(\overline{V}_{on-1} - \overline{V}_{on})$ and then multiplied together to obtain a signal $\overline{V} = (\overline{V}_{Rn-1} - \overline{V}_{Rn}) \cdot (\overline{V}_{on-1} - \overline{V}_{on})$ at the output of multiplier 30.

The product signal $\overline{V}$ is amplified and inverted, and then used to control (i.e., open or close) gate 34 through which the sidelobe canceller output signal $\overline{V}_{on}$ passes. If $\overline{V}$ is negative, gate 34 is inhibited (closed), but if $\overline{V}$ is positive, gate 34 is open.

Signal $\overline{V}$ will be negative when $(\overline{V}_{Rn-1} - \overline{V}_{RN})$ is positive if at the same time $(\overline{V}_{on-1} - \overline{V}_{on})$ is negative (arising from a reduction in jamming signal in the "main channel" accompanied by increased output ("increased residue") signal from the sidelobe canceller). This negative $\overline{V}$ indicates that the canceller output signal should be blocked from use by the radar system. Signal $\overline{V}$ will also be negative if $(\overline{V}_{Rn-1} - V_{Rn})$ is negative and if at the same time $(\overline{V}_{on-1} - V_{on})$ is positive (indicative of a signal increase in the main channel, but with decreased signal canceller output). It is desirable but not necessary to have the sidelobe canceller output signal blocked in this instance.

Signal $\overline{V}$ will be positive if both $(\overline{V}_{Rn-1} - \overline{V}_{Rn})$ and $(\overline{V}_{on-1} - \overline{V}_{on})$ are negative or positive. Both $(\overline{V}_{Rn-1} - \overline{V}_{Rn})$ and $(\overline{V}_{on-1} - \overline{V}_{on})$ would be negative during receipt by the radar antenna 10 of a desired signal which should not be blocked or cancelled. If both $(\overline{V}_{Rn-1} - \overline{V}_{Rn})$ and $(\overline{V}_{on-1} - \overline{V}_{on})$ are positive, the loops are functioning properly and the output from the sidelobe canceller should not be blocked.

The technique of the present invention thereby allows design of signal canceller loops having bandwidths reduced enough to prevent their cancelling incoming signal without suffering from spurious cancelling introduced by a sudden reduction in the effective jamming signal due to destructive cancellation.

Obviously many modifications and variations of the present invention are possible in light of the above teachings. It is therefore to be understood that within the scope of the appended claims the invention may be practiced otherwise than as specifically described.

What is claimed and desired to be secured by letters patent of the U.S. is:

1. A method of preventing utilization by a radar system of a signal $V_{oa}$ from a sidelobe canceller during the period that a signal $V_R$ at a radar antenna experiences reduced effective jamming signal interference while a jamming signal is simultaneously present at the output of an associated sidelobe canceller auxiliary antenna comprising the steps of:

sensing successive canceller output signals $V_{on}$, $V_{on-1}$;

forming a first difference signal $(V_{on} - V_{on-1})$ which may be positive or negative;

sensing successive main channel radar signals $V_{Rn-1}$, $V_{Rn}$;

forming a second difference signal $(V_{Rn-1} - V_{Rn})$ which may be positive or negative;

forming a product signal by multiplying said first difference signal by said second difference signal;

interrupting receipt by the radar system of the sidelobe canceller output signal whenever said product signal is negative.

2. A system for preventing utilization by a radar system of a signal $V_o$ from a sidelobe canceller to which a radar is coupled during the period that a signal $V_R$ at the radar antenna experiences reduced effective jamming signal interference while a jamming signal is simultaneously present at the output of an associated sidelobe canceller auxiliary antenna comprising:

means for sensing sequential values $V_{Rn-1}$, $V_{Rn}$ of the radar signal $V_R$;

means for forming a first difference signal $V_{Rn-1} - V_{Rn}$ which may be positive or negative;

means for sensing sequential values $V_{on-1}$, $V_{on}$ of the output sidelobe canceller signal $V_o$;

means for forming a second difference signal $V_{on-1} - V_{on}$ which may be positive or negative;

means for multiplying said first different signal by said second difference signal thereby producing a product signal;

means for disconnecting the output of said signal canceller from said radar system when said product signal is negative.

* * * * *